R. N. SHAW.
AUTOMOBILE POWER MECHANISM.
APPLICATION FILED FEB. 21, 1916.

1,191,350.

Patented July 18, 1916.
2 SHEETS—SHEET 1.

Witness
Sylvia Boron.

Inventor
Robert N Shaw
By F. W. Borg
Attorney

R. N. SHAW.
AUTOMOBILE POWER MECHANISM.
APPLICATION FILED FEB. 21, 1916.
1,191,350.
Patented July 18, 1916.
2 SHEETS—SHEET 2.
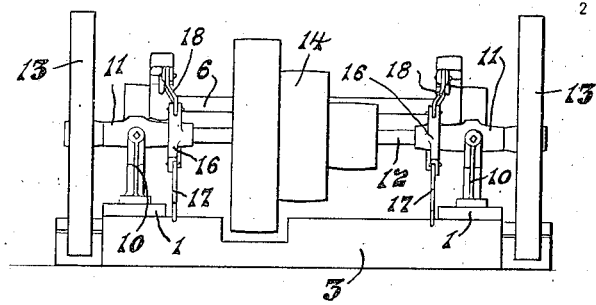
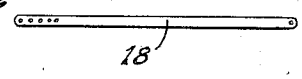
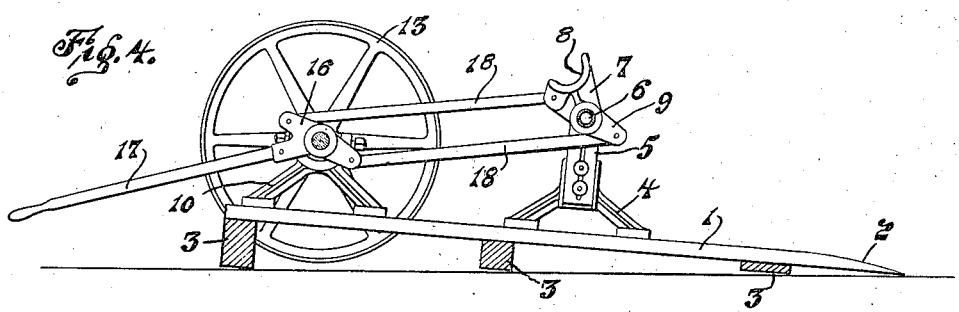
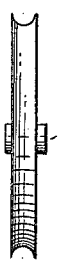 
Witness
Sylvia Boron,
Inventor
Robert N. Shaw
By F. W. Bond
Attorney

UNITED STATES PATENT OFFICE.

ROBERT N. SHAW, OF SAVANNAH, OHIO.

AUTOMOBILE POWER MECHANISM.

1,191,350. Specification of Letters Patent. Patented July 18, 1916.

Application filed February 21, 1916. Serial No. 79,541.

*To all whom it may concern:*

Be it known that I, ROBERT N. SHAW, a citizen of the United States, residing at Savannah, in the county of Ashland and State of Ohio, have invented a new and useful Automobile Power Mechanism, of which the following is a specification.

My invention relates to improvements in an automobile power mechanism and has more especial reference to a device of the character mentioned which is more particularly intended for use in connection with an automobile for transmitting power from the rear or driven wheels thereof to a machine to be driven by such transmitted power.

The objects of the present invention are to provide a power transmitting apparatus for use in connection with motor vehicles which will be simple and inexpensive in construction, strong, durable and efficient in operation and so constructed as to be readily portable and placed in such position that a motor vehicle may be easily mounted thereon and held in such position that power from the motor vehicle may be transmitted through the driven wheels of said vehicle to sewing machines, feed cutters, pumps and numerous other devices for which power is needed.

A further object is to provide a device of the character referred to by which the power of an automobile may be transmitted to other machinery without requiring the dismounting of any part of the automobile, the automobile being moved into position without the necessity of stopping the engine.

A still further object is the provision of a device of this character which may be inverted and transported upon its own wheels.

With these objects in view the invention consists in the novel construction and arrangement of parts, hereinafter described, illustrated in the accompanying drawings, and particularly pointed out in the appended claim, it being understood that various changes in the form, proportions, size and minor details of construction may be made within the scope of the appended claim, without departing from the spirit or sacrificing any of the advantages of the invention.

Figure 1:
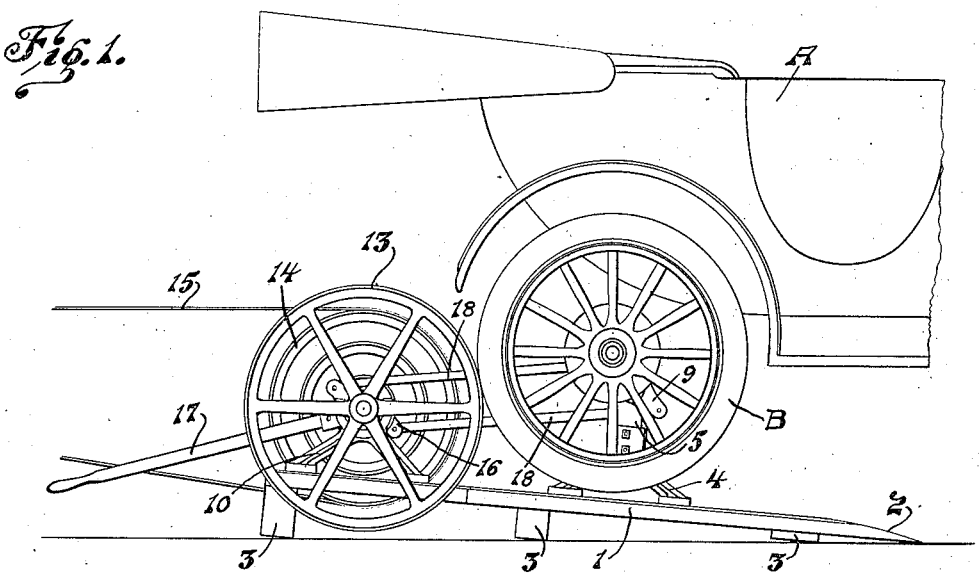
Figure 2:
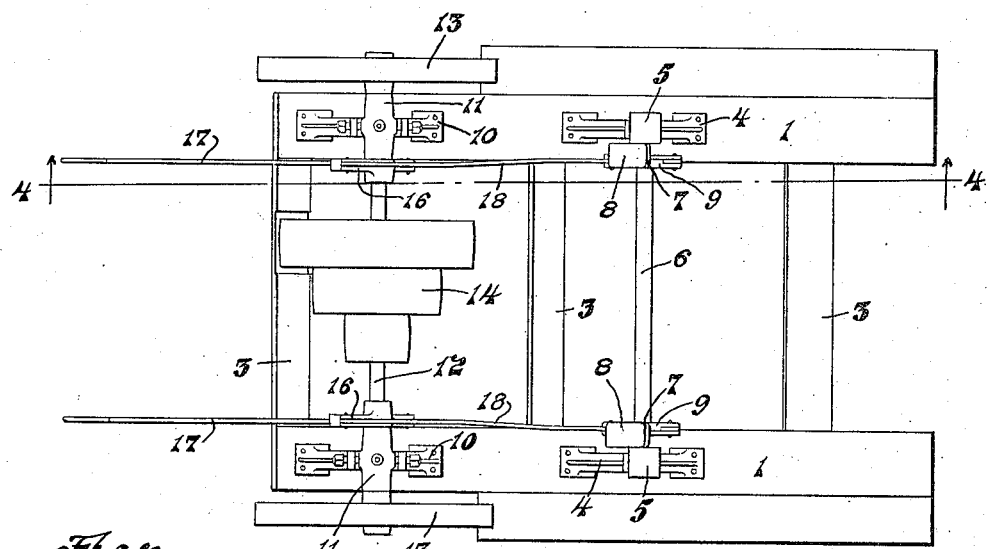

In the accompanying drawings: Figure 1 is a side elevation of my device, showing a motor vehicle mounted for operation thereon. Fig. 2 is a top plan view of the device. Fig. 3 is a rear elevation of the same. Fig. 4 is a section on the line 4—4, Fig. 2. Fig. 5 is a detail view of one of the links. Figs. 6 and 7 are edge views of two modified forms of friction pulleys.

Similar numerals of reference indicate corresponding parts throughout the several figures of the drawing.

The device comprises a platform made up of the spaced planks 1, the forward extremities of which are tapered as indicated at 2, said planks being mounted upon the cross timbers 3, said cross timbers diminishing in cross section from the rear to the forward extremity of the platform, thus holding the planks 1 in an inclined position as best shown in Figs. 1 and 4 in order that the rear wheels of a motor vehicle may ride upon said platform. Intermediate the front and rear extremities of each of the planks 1 is mounted a bracket 4, a bearing 5 being adjustably mounted upon each of said brackets. Journaled in the bearings 5 is a shaft 6 upon which shaft is mounted a pair of castings 7, said castings being spaced as best shown in Fig. 2. Each of the castings 7 is provided with a channel portion 8 adapted to receive the rear axle of a motor vehicle and a downwardly depending integral arm 9 is formed upon each of the castings 7.

Mounted near the rear portion of the platform and spaced from each other is a pair of brackets 10, each of said brackets being provided with a bearing portion 11 within which is journaled a shaft 12, said shaft carrying at each extremity a friction pulley 13, which friction pulley may either be of the form shown in the drawings in Figs. 1 to 4 inclusive or the forms shown in Figs. 6 or 7 of the drawings. A plurality of belt pulleys 14, of different diameters, is carried upon the shaft 12 between the bearings 11 and a belt 15 may be passed over any one of the pulleys 14, said belt being connected to the mechanism adapted to be driven by the power transmitted from the motor vehicle. Pivoted upon the shaft 12 is a pair of spaced levers 16, an operating handle 17 being rigidly connected to each of said levers. A pair of links 18 are pivotally connected to opposite extremities of each of the levers 16, one of said links being pivotally connected to the arm 9 of the casting 7 and the other link pivotally connected to the upper portion of said casting.

A motor vehicle designated by the letter

A may be backed upon the platform, the operating handles 17 being thrown upwardly to bring the castings 7 into position so that the channel portions of said castings will receive the rear axle of the automobile. The operating handles are then thrown downwardly into the positions shown in Figs. 1 and 4, rocking the castings 7 backwardly and as the upper portions of said castings are thrown over the center the tires B upon the rear wheels of the automobile will be thrown into frictional contact with the friction pulleys 13 as shown in Fig. 1. During the operation of the automobile engine, the shaft 12 will thus be driven and the power transmitted from said shaft through any of the pulleys 14 and the belt 15 to the device desired to be driven.

When it is desired to move the device above described it may be inverted, using the friction pulleys 13 as road wheels and may be connected behind a vehicle and transported to any desired location.

Although the drawings and above specification disclose the best mode in which I have contemplated embodying my invention I desire to be not limited to the details of such disclosure, for in the further practical application of my invention, many changes in form and construction may be made, as circumstances require or experience suggests, without departing from the spirit of the invention, within the scope of the appended claim.

I claim:

A device of the character described, comprising an inclined platform, brackets mounted upon the rear portion of said platform, a shaft journaled in said brackets, friction pulleys mounted upon said shaft, means on said shaft for transmitting power therefrom, a second pair of brackets mounted upon said platform, a shaft journaled in said last named brackets, axle supporting members mounted upon said last named shaft, each of said members comprising an upper channel member and a lower arm, a pair of levers pivotally mounted upon said first named shaft, and a pair of links pivotally connecting each of said levers to one of said axle supporting members, one of said links connecting the upper extremity of each lever to the upper extremity of the adjacent axle supporting member and one of said links connecting the lower extremity of each lever to the arm of the adjacent axle supporting member.

In testimony that I claim the above, I have hereunto subscribed my name.

ROBERT N. SHAW.

Copies of this patent may be obtained for five cents each, by addressing the "Commissioner of Patents, Washington, D. C."